(12) United States Patent
Onoe

(10) Patent No.: US 6,493,477 B2
(45) Date of Patent: Dec. 10, 2002

(54) OPTICAL INTEGRATED CIRCUIT AND MANUFACTURING METHOD THEREFOR

(75) Inventor: Atsushi Onoe, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/050,044

(22) Filed: Jan. 17, 2002

(65) Prior Publication Data

US 2002/0118906 A1 Aug. 29, 2002

(30) Foreign Application Priority Data

Jan. 22, 2001 (JP) .................................. 2001-012928

(51) Int. Cl.[7] .............................. G02B 6/12; H01S 3/19
(52) U.S. Cl. ............................ 385/14; 372/45; 257/184; 438/107; 385/130; 385/131
(58) Field of Search ................................ 385/14–16, 24, 385/129, 123, 132, 130, 17, 50, 147; 372/45, 46, 50; 438/31, 39, 65, 456, 180; 257/17, 20, 85, 98, 459; 359/248

(56) References Cited

U.S. PATENT DOCUMENTS

| | | | | |
|---|---|---|---|---|
| 5,054,871 A | * | 10/1991 | Deri et al. | 385/130 |
| 5,373,521 A | * | 12/1994 | Takahashi | 372/45 |
| 5,682,455 A | * | 10/1997 | Kovacic et al. | 385/131 |
| 5,841,930 A | * | 11/1998 | Kovacic et al. | 372/45 |
| 5,917,981 A | * | 6/1999 | Kovacic et al. | 257/184 |
| 6,108,464 A | * | 8/2000 | Foresi et al. | 385/131 |
| 6,150,188 A | * | 11/2000 | Geusic et al. | 438/107 |

* cited by examiner

Primary Examiner—Akm E. Ullah
(74) Attorney, Agent, or Firm—Sughrue Mion, PLLC

(57) ABSTRACT

The present invention reduces the waveguide loss in an optical coupling between an optical waveguide layer and a photodetector. A cladding layer having a first refractive index is formed on a photodetector formed on a substrate by repeating spin-coating and curing of SOG. The cladding layer is formed in such a way as to gently cover a step portion between the photodetector and a light shielding layer. An optical waveguide layer which can allow propagating light to be coupled to the photodetector is formed on the cladding layer. This structure can suppress steep curvature of the optical waveguide layer above the photodetector.

10 Claims, 4 Drawing Sheets

$(\theta_2 < \theta_1)$

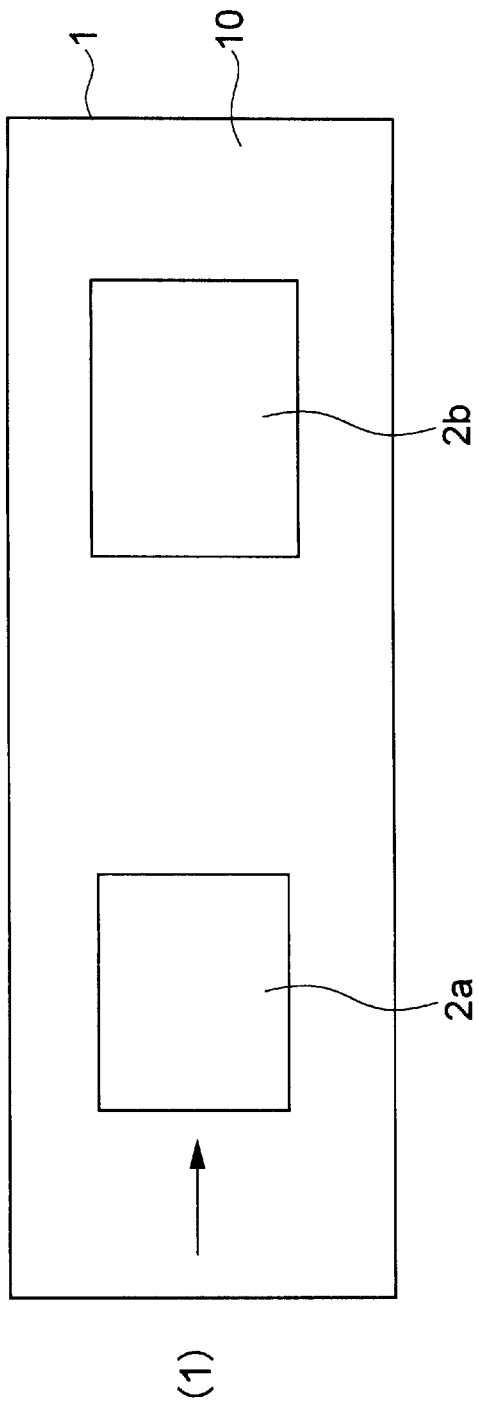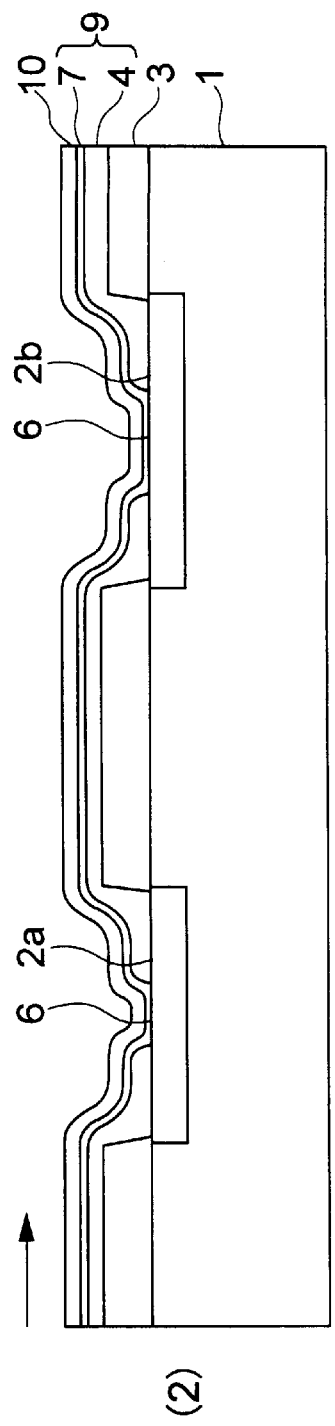

OPTICAL INTEGRATED CIRCUIT AND MANUFACTURING METHOD THEREFOR

BACKGROUND OF THE INVENTION

1. Technical Field

The present invention relates to an optical integrated circuit and a manufacturing method thereof, and, more particularly, to an optical integrated circuit which couples light from an optical waveguide to a photodetector with a low loss and a method of manufacturing the structure.

2. Related Art

A conventional waveguide optical signal detector comprises an $SiO_2$ buffer layer formed on one major surface of, for example, a silicon substrate by thermal oxidation, a photodetector provided by an ordinary semiconductor process, a tapered optical coupling area formed on the photodetector by Local Oxidation of Silicon (LOCOS), and an optical waveguide layer formed thereon.

In a case where the optical waveguide layer is of a phase matching type which takes a multi-layer structure, at least one optical waveguide layer other than the main optical waveguide layer and a cladding layer which is sandwiched between the optical waveguide layers are alternately deposited on the photodetector formed on the substrate.

In a structure or assembly that has a tapered optical coupling area, however, the substrate on which a $SiO_2$ buffer layer can be formed by the thermal oxidation is limited to a silicon substrate. Further, as the structure requires a process to be conducted under a vacuum condition and a high-temperature treatment, the fabrication process is complicated and the structure is expensive.

In a case where the optical coupling area takes a simple tapered structure, it is known that propagating light suffers a large optical loss at the curve portion of the optical waveguide layer. To reduce the light loss, a scheme of controlling the taper angle has been considered, which, however, is difficult to achieve.

When a multi-layer structure is adopted, the process is originally complex. As optical coupling is based on phase matching, an optimal structure is needed for each wavelength of light to be used. Therefore, this structure is not suitable for detection of multi-wavelength signal light having different wavelengths to be detected.

To ensure efficient signal detection, the latter structure requires a relatively large photo-detection area as compared with the former structure that directly leads the waveguide layer to the photo-detection device, and is not therefore suitable for making the whole device, including the photo-detection device, compact.

OBJECT OF THE INVENTION

Accordingly, it is an object of the present invention to provide an optical integrated circuit which reduces a waveguide loss within a waveguide from an optical waveguide to a photodetector.

It is another object of the present invention to provide a method for manufacturing the above optical integrated circuit easily and at a low cost.

SUMMARY OF THE INVENTION

According to a first aspect of the invention, there is provided an optical integrated circuit comprising: a photodetector formed on a substrate; a cladding layer formed over said photodetector on one major surface of said substrate, said cladding layer having a first refractive index; and an optical waveguide layer formed on said cladding layer and having a second refractive index greater than said first refractive index. The cladding layer comprises a plurality of sub-cladding layers overlaid on each other in a thickness direction of said substrate, said cladding layer includes a first portion provided over the photodetector, a second portion provided on an area of the photodetector except for the first portion, said second portion having less thickness than that of said first portion, and a smooth curve portion coupling said first portion to said second portion.

According to another aspect of the invention, there is provided a method for manufacturing an optical integrated circuit in a substrate, having a photodetector provided in a surface of the substrate, a light shielding layer positioned on and around a peripheral portion of said photodetector, and an optical waveguide provided over the photodetector and a portion of the light shielding layer, the light shielding layer having a step-portion on and around a periphery portion of the photodetector, comprising the steps of: forming a cladding layer having a plurality of sub-cladding layers overlaid on each other in a thickness direction on said substrate, said cladding layer having a thickness to enable light to be guided to said photodetector; and forming an optical waveguide layer on said cladding layer, said optical waveguide layer having a higher refractive index than that of said cladding layer, and said optical waveguide layer being optically coupled to said photodetector. The step of forming a cladding layer includes the steps of applying and curing an insulating liquid on said substrate to form one of the plurality of sub-cladding layers, and repeating the step of applying and curing a liquid insulator a predetermined number of times, where said sub-cladding layers cover said step-portion.

According to further aspect of the invention, there is provided a method for manufacturing an optical integrated circuit on a substrate, said optical integrated circuit having a photodetector and an optical waveguide provided over the photodetector, comprising the steps of: forming a cladding layer having a plurality of sub-cladding layers overlaid on each other in a thickness direction on said substrate, said cladding layer having a thickness permitting light to be guided to said photodetector; and forming an optical waveguide layer on said cladding layer, said optical waveguide layer having a higher refractive index than that of said cladding layer, and said optical waveguide layer being optically coupled to said photodetector. The step of forming a cladding layer includes the steps of applying and curing an insulating liquid on said substrate to form one of the plurality of sub-cladding layers, and repeating the step of applying and curing a liquid insulator a predetermined number of times, wherein said sub-cladding layers cover said step-portion.

BRIEF DESCRIPTION OF THE DRAWINGS

For a better understanding of the invention reference is made to the following detailed description of the preferred embodiments which should be referenced to the herein before described drawings:

FIG. 3A is a top view of one embodiment of an optical integrated circuit having a plurality of photodetectors;

FIG. 3B is a cross-sectional view of the optical integrated circuit of FIG. 3A.

DETAILED DESCRIPTION OF THE EMBODIMENTS

The present invention will be described in detail as to one preferred embodiment of an optical integrated circuit produced by a method of the present invention, referring to the accompanying drawings.

Figure 1:
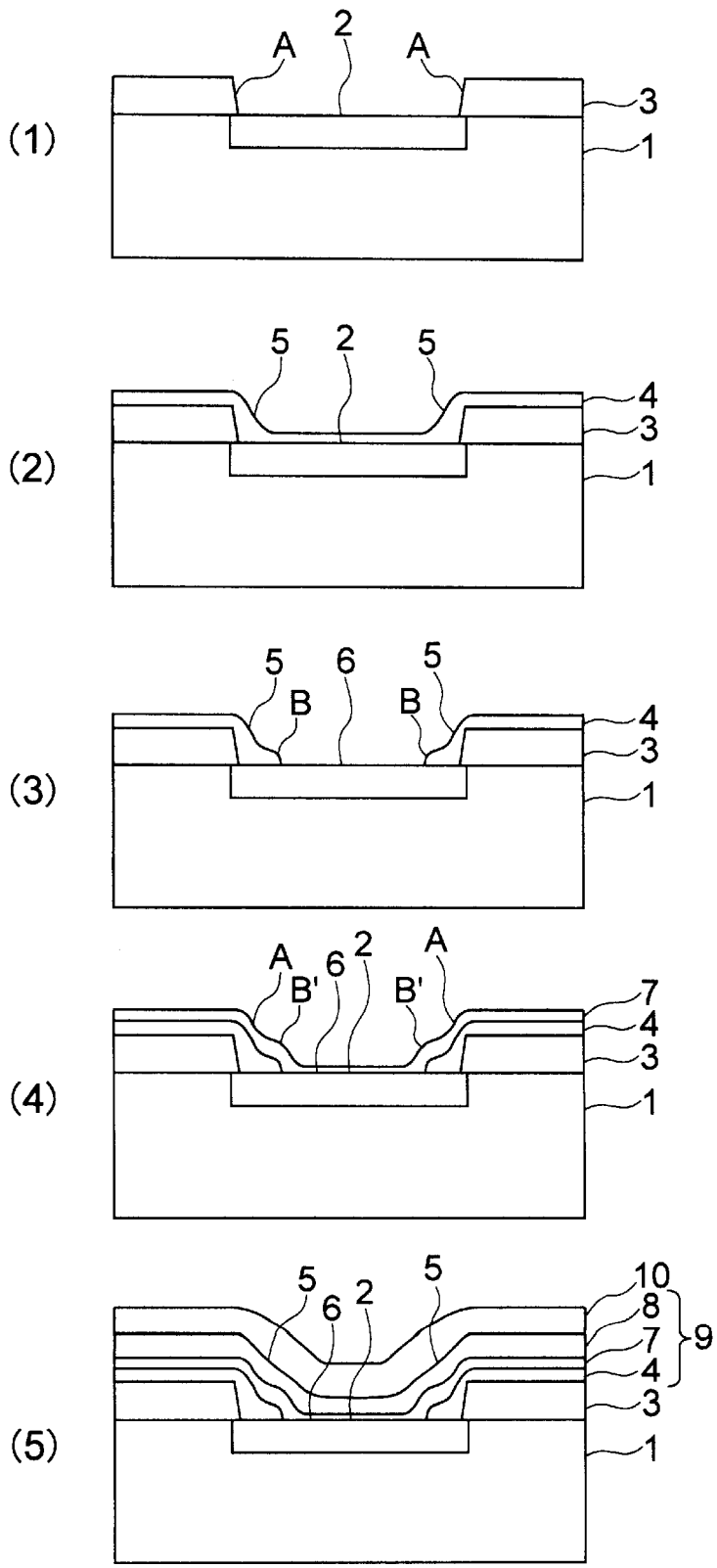
FIG. 1 is a flow diagram explaining a method for producing an optical integrated circuit, according to the present invention.

In FIG. 1, a photodetector 2 is formed as an optical device on one major surface of a silicon substrate 1 using a well-known process. Next, a light shielding layer 3 is formed of, for example, aluminum on one major surface of the substrate 1 excluding the area where the photodetector 2 is formed ((1) in FIG. 1). The light shielding layer 3 has a thickness sufficient to prevent stray light from above from reaching the substrate 1. The end face of the light shielding layer 3 is formed as a steep step portion A with respect to the photodetector 2.

Next, spin on glass (SOG) as a liquid insulator is spin-coated on the substrate 1 and cured, thereby forming a first sub-cladding layer 4 having a first refractive index n ((2) in FIG. 1). A curve portion 5 of the sub-cladding layer 4 formed on the step portion A is formed by embedding the step portion A in SOG by utilizing the viscosity and surface tension characteristics of SOG, so that the step portion is less inclined.

Next, that portion of the sub-cladding layer 4 which faces the photodetector 2 is removed by a reactive ion etching (RIE) process (using a $CF_4$ gas), thus exposing a light-receiving surface 6 of the photodetector 2. A new steep step portion B is formed at the end face of the opening ((3) in FIG. 1) . At this time, the sub-cladding layer 4 on the photodetector 2 may be removed completely or a sub-cladding layer having a slight thickness may be left to suppress the influence of plasma produced in the RIE etching process on the photodetector 2.

Then, SOG is spin-coated and cured again to such a thickness as to be able to detect an optical signal above the photodetector 2, thereby forming a second sub-cladding layer 7. At this time, the step portion B is turned into a step portion B' having less inclination to the light-receiving surface 6 than the step portion B by using the viscosity and surface tension of SOG ((4) in FIG. 1).

Further, the portion of th e second sub-cladding layer 7 which face s the photodetector 2 is removed b y an RIE etching process (using a $CF_4$ gas). The thickness of the second sub-cladding layer 7 to be etched should be equal to or less than the first thickness of the second sub-cladding layer 7.

Next, a third sub-cladding layer 8 is formed by spin coating. The third sub-cladding layer 8 is coated and cured to such a thickness as to be able to detect an optical signal, for example, 0.2 μm. For example, the first to third sub-cladding layers form a cladding layer 9 having a thickness of, for example, 1 μm on the light shielding layer 3. As mentioned above, it is necessary to set the thickness of the cladding layer 9 to the size that allows light propagating in the optical waveguide layer 10 to be optically coupled to the photodetector 2 via the light-receiving surface 6. For a portion other than the light-receiving surface 6, it is necessary to confine light in the waveguide and prevent the light from leaking out of the cladding layer 9 by setting the thickness of the cladding layer 9 greater than that of the cladding layer on the light-receiving surface 6.

Further, Corning 7059 is used as a material to form, by sputtering, the optical waveguide layer 10 having a thickness of, for example, 0.7 μm ((5) in FIG. 1). The optical waveguide layer 10 serves as an optical waveguide in which a light beam travels in a guided mode. Further, the optical waveguide layer 10 is formed in such a way that the refractive index of the optical waveguide layer 10 is higher than the refractive index of the cladding layer 9.

Grating or overcladding for the purpose of light incident to and existing from the waveguide can be formed at the desired portion of the waveguide as needed.

In the above-described structure, the refractive index and the thickness should be set adequately for a light beam to efficiently propagate in the optical waveguide layer 10. In this embodiment, for light having a wavelength in the range of 650 nm to 780 nm, the optical waveguide layer (Corning 7059) 10 is set to have a refractive index of 1.53 and a thickness of 0.7 μm. The cladding layer 9 is set to have a refractive index of 1.43 and a thickness of 1 μm except for the area facing the photodetector. However, the wavelength of light, the material and thickness are not limited to the above-described values as long as the combination satisfies the waveguide conditions.

In this embodiment, the cladding layer 9 is formed by repeatedly coating and curing the same type of SOG. The cladding layer 9, however, can be formed by combining different types of liquid dielectric materials if the effective refractive index of the cladding layer 9 satisfies the condition to confine light in the waveguide.

The above embodiment has a structure such that the cladding layer comprises three sub-cladding layers. However, two or more sub-cladding layers can demonstrate the same advantage, and a plurality of sub-cladding layers can be formed by repeating the coating, curing and etching of SOG.

As described above, as the cladding layer 9 is formed by repeating the process of coating, curing and etching SOG on the substrate 1 where the photodetector 2 is formed, the cladding layer 9 smoothly covers the step portions A and B lying between the light-receiving surface 6 of the photodetector 2 and the light shielding layer 3 so that the steep curve of the optical waveguide layer 10, formed near the step portions A and B, in the vicinity of the photodetector can be suppressed. This makes it possible to reduce the waveguide loss of a propagating light beam.

Figure 2:
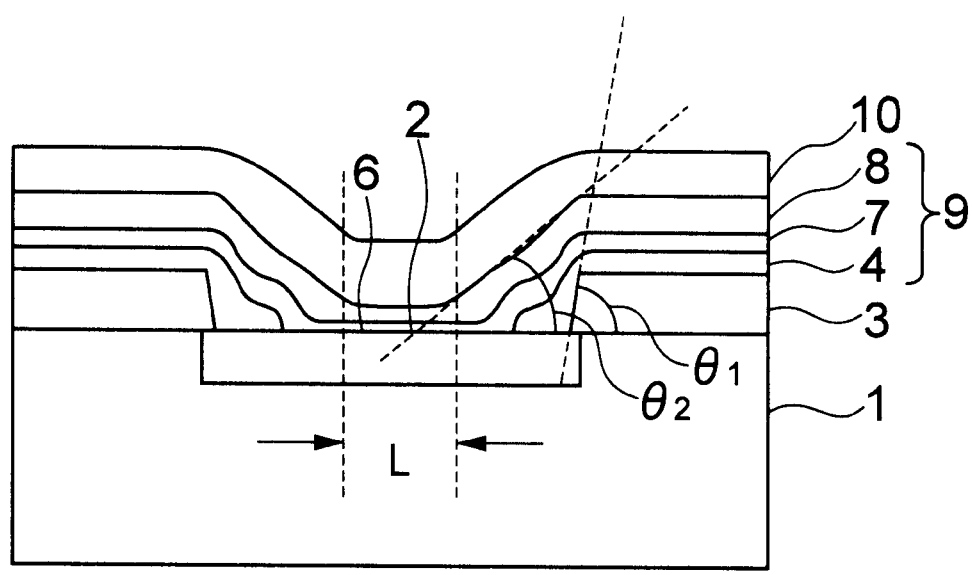
FIG. 2 is a cross-sectional view of an optical integrated circuit according to the present invention.

FIG. 2 illustrates how the curvature of the optical waveguide layer 10 is suppressed by the cladding layer 9 formed by SOG. The step portion A formed by the light-receiving surface 6 of the photodetector 2 and the light shielding layer 3 has an inclination angle of $\theta_1$ with respect to the substrate 1. As the cladding layer 9 is formed by forming a plurality of sub-cladding layers, however, the step portion formed by the light-receiving surface 6 of the photodetector 2 and the light shielding layer 3 is gradually covered, and an inclination angle $\theta_2$ of the step portion with respect to the light-receiving surface 6 decreases. It is preferable that $\theta_2$ should be equal to or less than 45 degrees for the following reason. By setting $\theta_2$ equal to or less than 45 degrees, the curve portion of the cladding layer 9 that is formed above the light-receiving surface 6 and the light shielding layer 3 via the step portion can be easily formed in a round shape. It is therefore possible to suppress radiation loss of light propagating in the optical waveguide layer 10 formed on the gently rounded curve portion.

Setting $\theta_2$ equal to or less than 45 degrees can efficiently disperse the stress that is produced in the cladding layer formed at the curve portion by coating and curing SOG. This can suppress cracking and separation of the cladding layer 9.

Again, the problem of the optical waveguide layer 10 over the photodetector 2 can be overcome by the step portion having a gently inclined surface, thus suppressing the waveguide loss caused by the curvature of the optical waveguide layer.

The small waveguide loss can reduce the light propagation loss in the optical waveguide layer 10. This can increase the amount of light that is detected by the photodetector. Further, as the amount of guided light is large, the photodetector 2 can efficiently detect a signal. This can contribute to making the size of the photodetector 2 smaller.

The step portion formed by the light-receiving surface 6 and the light shielding layer 3 can be easily made smoother by the process of coating, curing and etching SOG. The manufacture of the optical integrated circuit does not therefore require expensive equipment, such as a vacuum system, and can be accomplished in a short period of time, thus suppressing manufacturing cost.

The cladding layer 9 on the photodetector 2 is made thinner than the cladding layer 9 lying on the area other than the photodetector 2, so that the amount of light to be detected by the photodetector 2 can be adjusted by adjusting the length L of the light-receiving surface 6 in the propagation direction of a light beam traveling in the optical waveguide layer 10. Further, adjusting the thickness of the cladding layer 9 on the photodetector 2 can adjust the amount of light that is detected by the photodetector 2. Utilizing this, therefore, light can be detected sequentially by using two or more photodetectors.

For example, as shown in FIGS. 3A and 3B, two or more photodetectors 2a, 2b are formed on one major surface of the substrate 1 along the propagation direction of light in the optical waveguide layer 10. The cladding layer 9 which is formed on the photodetectors 2a, 2b is made thinner than the cladding layer 9 that lies on the portions other than the photodetectors 2a, 2b. At this time, the light that propagates in the optical waveguide layer 10 without entering the first photodetector 2a can be led to the second photodetector 2b and detected by the photodetector 2b by adequately adjusting the thickness of the cladding layer 9 formed on the photodetectors 2a, 2b. In FIGS. 3A and 3B, the arrows indicate the propagation direction of light.

Besides SOG, polyimide or acrylate resin can be used as a liquid insulator having the proper surface tension for the material for the cladding layer 9. In the embodiment, OCD (registered trademark) that is sold by Tokyo Ohka Kogyo Co., Ltd. is used as SOG. OCD is a coating liquid for forming a coat essentially consisting of silicon oxide ($SiO_2$) by coating and baking in the process of manufacturing various kinds of electronic parts.

In this embodiment, silicon is used for the substrate 1 in the embodiment, the material, however, is not limited to silicon, and any adequate material can be used for the substrate 1. In this case, when the refractive index of the substrate is higher than the refractive indexes of the cladding layer and the waveguide layer, the thickness of the cladding layer is set in such a way that a light beam which travels in the waveguide layer is not absorbed by the substrate.

Figure 4:
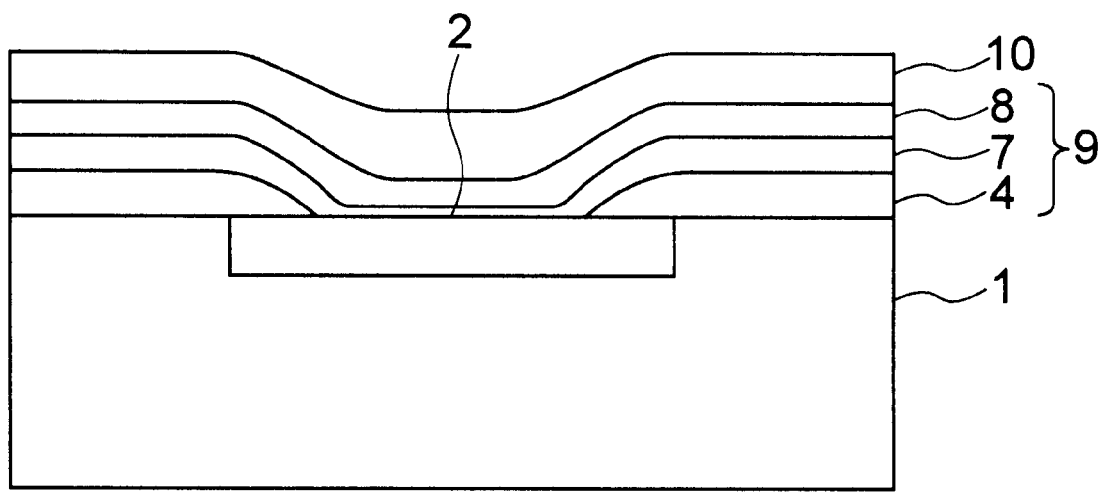
FIG. 4 is a cross-sectional view of another embodiment of the optical integrated circuit produced by a method of the present invention.

The foregoing description has been given of the above embodiment that has a light shielding layer. An optical integrated circuit similar to the optical integrated circuit of the above embodiment, however, can be produced by forming the cladding layer of a plurality of sub-cladding layers even when no light shielding layer is provided. FIG. 4 shows one embodiment of an optical integrated circuit which does not have a light shielding layer.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2001-12928 which is hereby incorporated by reference.

What is claimed is:

1. An optical integrated circuit comprising:
   a photodetector formed on a substrate;
   a cladding layer formed over said photodetector on one major surface of said substrate, said cladding layer having a first refractive index; and
   an optical waveguide layer formed on said cladding layer and having a second refractive index greater than said first refractive index, wherein
   said cladding layer comprises a plurality of sub-cladding layers overlaid on each other in a thickness direction of said substrate, said cladding layer includes a first portion provided over the photodetector, a second portion provided on an area of the photodetector except for the first portion, said second portion having less thickness than that of said first portion, and a smooth curve portion coupling said first portion to said second portion.

2. The optical integrated circuit according to claim 1, wherein an inclination angle of said curve portion to said substrate is equal to or less than 45 degrees.

3. The optical integrated circuit according to claim 1, wherein a plurality of photodetectors are provided independently from one another along a light propagating direction of said optical waveguide layer.

4. The optical integrated circuit according to claim 1, further comprising a light shielding layer provided between a bottom sub-cladding layer and said substrate and placed on and around a peripheral portion of said photodetector.

5. The optical integrated circuit according to claim 4, wherein an inclination angle of said curve portion to said substrate is equal to or less than 45 degrees.

6. The optical integrated circuit according to claim 4, wherein a plurality of photodetectors are provided independently from one another along a light propagating direction of said optical waveguide layer.

7. A method for manufacturing an optical integrated circuit in a substrate, having a photodetector provided in a surface of said substrate, a light shielding layer positioned on and around a peripheral portion of said photodetector, and an optical waveguide provided over the photodetector and a portion of the light shielding layer, the light shielding layer having a step-portion on and around a periphery portion of the photodetector, comprising the steps of:
   forming a cladding layer having a plurality of sub-cladding layers overlaid on each other in a thickness direction on said substrate, said cladding layer having a thickness to enable light to be guided to said photodetector; and
   forming an optical waveguide layer on said cladding layer, said optical waveguide layer having a higher refractive index than that of said cladding layer, and said optical waveguide layer being optically coupled to said photodetector, wherein said step of forming a cladding layer includes the steps of applying and curing an insulating liquid on said substrate to form one of the plurality of sub-cladding layers, and repeating the step of applying and curing a liquid insulator a predetermined number of times, where said sub-cladding layers cover said step-portion.

8. The method according to claim 7, wherein said step for forming a cladding layer has a step of forming an opening in an area in one of said plurality of sub-cladding layers facing said photodetector, thereby adjusting said thickness of said cladding layer on said photodetector.

9. A method for manufacturing an optical integrated circuit on a substrate, said optical integrated circuit having a photodetector and an optical waveguide provided over the photodetector, comprising the steps of:

forming a cladding layer having a plurality of sub-cladding layers overlaid on each other in a thickness direction on said substrate, said cladding layer having a thickness permitting light to be guided to said photodetector; and forming an optical waveguide layer on said cladding layer, said optical waveguide layer having a higher refractive index than that of said cladding layer, and said optical waveguide layer being optically coupled to said photodetector, wherein said step of forming a cladding layer includes the steps of applying and curing an insulating liquid on said substrate to form one of the plurality of sub-cladding layers, and repeating the step of applying and curing a liquid insulator a predetermined number of times, wherein said sub-cladding layers cover said step-portion.

10. The method according to claim 9, wherein said step of forming a cladding layer comprises the step of forming an opening within an area in one of said plurality of sub-cladding layers, the area facing said photodetector, thereby adjusting said thickness of said cladding layer on said photodetector.

* * * * *